(12) United States Patent
Heitzenrater et al.

(10) Patent No.: US 8,579,753 B2
(45) Date of Patent: Nov. 12, 2013

(54) COMPOUND PLANETARY FRONT WHEEL DRIVE CONTINUOUSLY VARIABLE TRANSMISSION

(71) Applicants: GM Global Technology Operations LLC, Detroit, MI (US); Cynthia Grochowski, Howell, MI (US)

(72) Inventors: Scott William Heitzenrater, Orion, MI (US); Edwin T. Grochowski, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/733,945

(22) Filed: Jan. 4, 2013

(65) Prior Publication Data
US 2013/0210569 A1 Aug. 15, 2013

Related U.S. Application Data

(60) Provisional application No. 61/597,397, filed on Feb. 10, 2012.

(51) Int. Cl.
*F16H 37/02* (2006.01)
(52) U.S. Cl.
USPC .......................................... 475/216

(58) Field of Classification Search
USPC ......... 475/216, 215, 214, 209, 331, 269, 290, 475/271
See application file for complete search history.

(56) References Cited

U.S. PATENT DOCUMENTS

| 6,517,461 B2 * | 2/2003 | Shimizu ........................ 475/216 |
| 6,616,564 B2 * | 9/2003 | Shibukawa .................... 475/216 |
| 6,723,016 B2 * | 4/2004 | Sumi .............................. 475/216 |
| 6,931,316 B2 * | 8/2005 | Joe et al. ......................... 701/61 |
| 7,094,171 B2 * | 8/2006 | Inoue ............................. 475/215 |
| 7,217,216 B2 * | 5/2007 | Inoue ............................. 475/215 |
| 7,393,300 B2 * | 7/2008 | Miller et al. ................... 475/215 |
| 7,407,459 B2 * | 8/2008 | Greenwood et al. .......... 475/215 |
| 7,431,677 B2 * | 10/2008 | Miller et al. ................... 475/196 |
| 7,530,916 B2 * | 5/2009 | Greenwood ................... 475/216 |
| 8,257,216 B2 * | 9/2012 | Hoffman ....................... 475/207 |

* cited by examiner

*Primary Examiner* — David D Le
*Assistant Examiner* — David J Hlavka

(57) ABSTRACT

The present invention provides an automatic transmission for a motor vehicle having a compact single mode transfer gear continuously variable transmission (CVT) with a compound planetary gear carrier for use in front wheel drive vehicles. The automatic transmission includes an input shaft, a variator or other, similar device which provides a continuously variable input to output speed ratio over a limited range, a compound planetary gear assembly having a sun gear, a planet gear carrier with compound gear sets and a ring gear, a friction brake, a friction clutch and a plurality of transfer gears and layshafts.

18 Claims, 2 Drawing Sheets

| Gear State | Gear Ratio | 88 | 86 | 30 R | 30 1st | 30 6th |
|---|---|---|---|---|---|---|
| Rev | -10.709 | | X | X | | |
| N | - | | | | | |
| 1st | 14.243 | X | | | X | |
| 2nd | - | X | | | | |
| 3rd | - | X | | | | |
| 4th | - | X | | | | |
| 5th | - | X | | | | |
| 6th | 2.190 | X | | | | X |

COMPOUND PLANETARY FRONT WHEEL DRIVE CONTINUOUSLY VARIABLE TRANSMISSION

CROSS REFERENCE TO RELATED APPLICATION

This application claims the benefit of U.S. Provisional Patent Application Ser. No. 61/597,397, filed Feb. 10, 2012, which is hereby incorporated in its entirety herein by reference.

FIELD

The present disclosure relates to automatic transmissions for motor vehicles and more particularly to continuously variable automatic transmissions for front wheel drive vehicles having a compound planetary gear assembly.

BACKGROUND

The statements in this section merely provide background information related to the present disclosure and may or may not constitute prior art.

Because of performance and packaging benefits, particularly the elimination of the propeller (prop) shaft, front wheel drive (FWD) vehicles have proven popular with consumers. Such elimination not only generally reduces the weight of the powertrain and thus of the vehicle but also reduces and can essentially eliminate the driveline hump on the floor of the passenger compartment. These benefits are especially pronounced in smaller size vehicles.

The placement of the engine, transmission, differential and drive axles, as well as steering components, all in the forward portion of the motor vehicle does, however, present design and packaging challenges which are greater than those encountered in rear wheel drive vehicles.

For example, certain transmission configurations, because of their tandem gear arrangements, occupy significant length along the torque flow path, i.e., from input to output. The incorporation of such transmissions in front wheel drive powertrains, oriented either transversely or longitudinally, may impact design and engineering choices about the particular vehicle in which certain transmissions may be used. Alternatively, passenger compartment volume may necessarily be slightly reduced to accommodate a particular transmission.

From the foregoing, it is apparent that the length as well as the overall size of a transmission will typically impact the design as well as the identity of a particular vehicle with which it is used. In turn, this renders it apparent that a more compact transmission will, all other things being equal, be more adaptable and usable in a wider variety of vehicles than a less compact transmission.

It is thus apparent that improvements, especially those directed to reduction of the overall size of an automatic transmission, are desirable and the present invention is so directed.

SUMMARY

The present invention provides an automatic transmission for a motor vehicle having a compact single mode transfer gear lay shaft continuously variable transmission (CVT) with a compound planetary gear carrier for use in front wheel drive vehicles. The automatic transmission includes an input shaft, a variator or other, similar device which provides a continuously variable input to output speed ratio over a limited range, a compound planetary gear assembly having a sun gear, a planet gear carrier with compound gear sets and a ring gear, a friction brake, a friction clutch and a plurality of transfer gears and layshafts. The input shaft is coupled to and drives an input of the variator. An output (drive) gear of the variator meshes with and drives a second (driven) gear of a first transfer gear pair which, in turn, is coupled to and drives the planetary gear carrier of the planetary gear assembly. The friction brake selectively grounds the ring gear of the planetary gear assembly. The planetary gear carrier is also coupled to one side of the friction clutch. The other side of the friction clutch and the sun gear of the planetary gear assembly are coupled to and drive a first (drive) gear of a second transfer gear pair. The second (driven) gear of the second transfer gear pair is coupled to a first (drive) gear of a third transfer gear pair which meshes with and drives a second (driven) gear. The second gear of the third transfer gear pair is coupled to and drives the output shaft.

Thus it is an aspect of the present invention to provide a compact single mode transfer gear layshaft continuously variable transmission.

It is a further aspect of the present invention to provide a compact single mode transfer gear continuously variable transmission with a compound planetary gear carrier.

It is a still further aspect of the present invention to provide a compact single mode transfer gear continuously variable transmission with a compound planetary gear carrier for use in front wheel drive vehicles.

It is a still further aspect of the present invention to provide a compact single mode transfer gear continuously variable transmission having a variator or similar device having a variable input to output speed ratio.

It is a still further aspect of the present invention to provide a compact single mode transfer gear continuously variable transmission having a friction brake and a friction clutch.

It is a still further aspect of the present invention to provide a compact single mode transfer gear continuously variable transmission having three pairs of transfer gears.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 3:
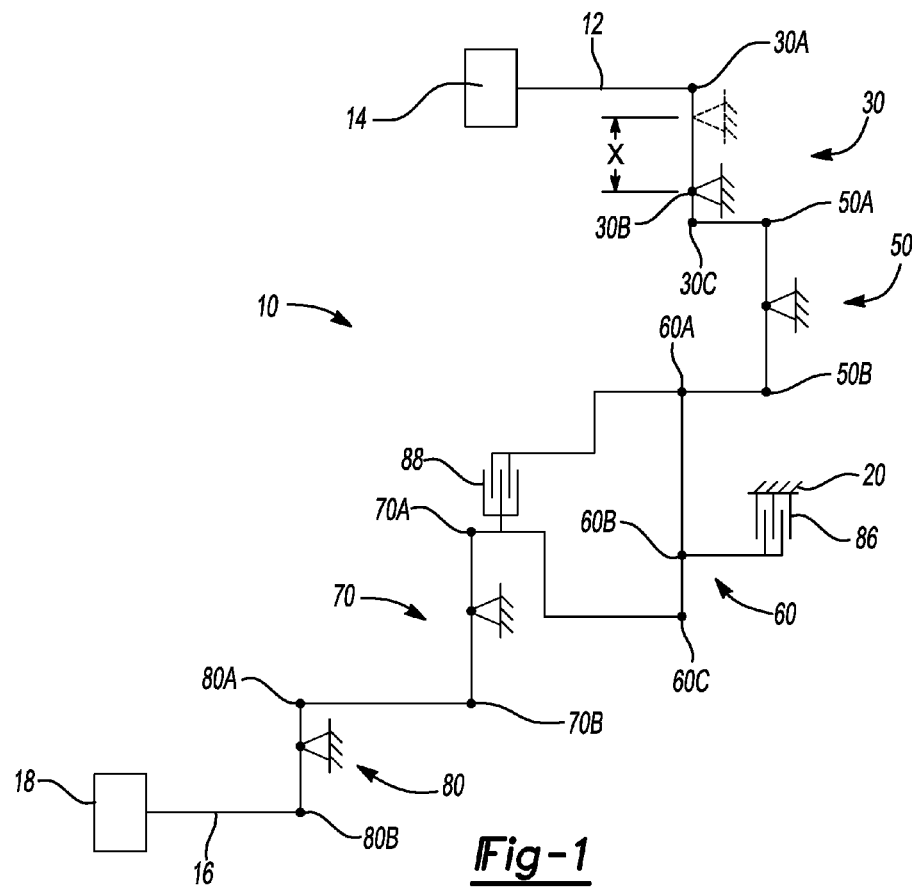
FIG. 1 is a lever diagram of a single mode continuously variable automatic transmission having a compound planetary gear assembly according to the present invention.
FIG. 3 is a truth table depicting engagement and release of the friction clutch and the friction brake as well as nominal gears (speed ratios) achieved by the transmission according to the present invention.

With reference to FIG. 1, a single mode, continuously variable automatic transmission having a compound planetary gear assembly according to the present invention is illustrated in a lever diagram and designated by the reference number 10. A lever diagram is a schematic representation of the components of an automatic transmission wherein a planetary gear assembly is represented by a vertical bar or lever and the components of the planetary gear assembly such as the sun gear, the planet gear carrier and the ring gear are represented by nodes. The relative lengths of the vertical bars between the nodes represent the ratios between the components. Transfer gears are represented by two nodes: an input node and an output node. In the case of the variable ratio component, it includes an input node and an output node and two pivot points represent the limiting, i.e., upper and lower input to output speed ratios, which it provides. Mechanical couplings or interconnections between the nodes such as shafts or quills are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The automatic transmission 10 includes an input shaft 12 which typically will be coupled to and driven by a prime mover 14 such as a gasoline, Diesel, flex fuel or hybrid engine or power plant, an output shaft 16 which will typically be coupled to and drive a final drive assembly 18 including a differential, axles, wheels and tires. The components of the automatic transmission 10 are located, secured and protected within a cast metal housing 20 which is referred to as "ground" with reference to FIG. 1.

The automatic transmission 10 includes a unique combination of levers and nodes. A variator 30, that is, a mechanical device capable of providing a continuously variable input to output speed ratio over a limited range, includes a first node 30A which is coupled to and driven by the input shaft 12, a second node 30B having a variable or moveable position which represents the variable ratio and a third node 30C. The adjustable range of the input to output speed ratio of the variator 30 is represented by the letter "X" in FIG. 1. The third node 30C of the variator 30 is coupled to and drives a first node 50A of a first transfer gear pair 50. The first transfer gear 50 includes a second node 50B. The second node 50B of the first transfer gear pair 50 is coupled to and drives a first node 60A of a compound planetary gear assembly 60. The compound planetary gear assembly 60 also includes a second node 60B and a third node 60C.

The third node 60C of the compound planetary gear assembly 60 is coupled to and drives a first node 70A of a second transfer gear pair 70. The second transfer gear pair 70 includes a second node 70B. The second node 70B of the second transfer gear pair 70 is coupled to and drives a first node 80A of a third transfer gear pair 80. The third transfer gear pair 80 includes a second node 80B which is coupled to and drives the output shaft 16.

Additionally, the automatic transmission 10 includes two selectively engageable torque transmitting devices, namely, one friction brake and one friction clutch. As utilized herein, the term "friction brake" refers to any torque transmitting device having a first plurality of rotatable friction plates or discs which are interleaved with a second, stationary plurality of plates or discs and which are compressed by an associated operator or actuator to ground or brake the rotating plates or discs to the housing 20. The term "friction clutch" refers to a similar device in which the first and second pluralities of interleaved friction plates or discs transmit torque between two rotatable members. It should be understood, however, that other clutch types and configurations are within the purview of this invention.

A friction brake 86 is operably disposed between the second node 60B of the compound planetary gear assembly 60 and ground (the housing 20) and a friction clutch 88 is operably disposed between the first node 60A of the compound planetary gear assembly 60 and the first node 70A of the second transfer gear pair 70 (and the third node 60C of the compound planetary gear assembly 60).

Figure 2:
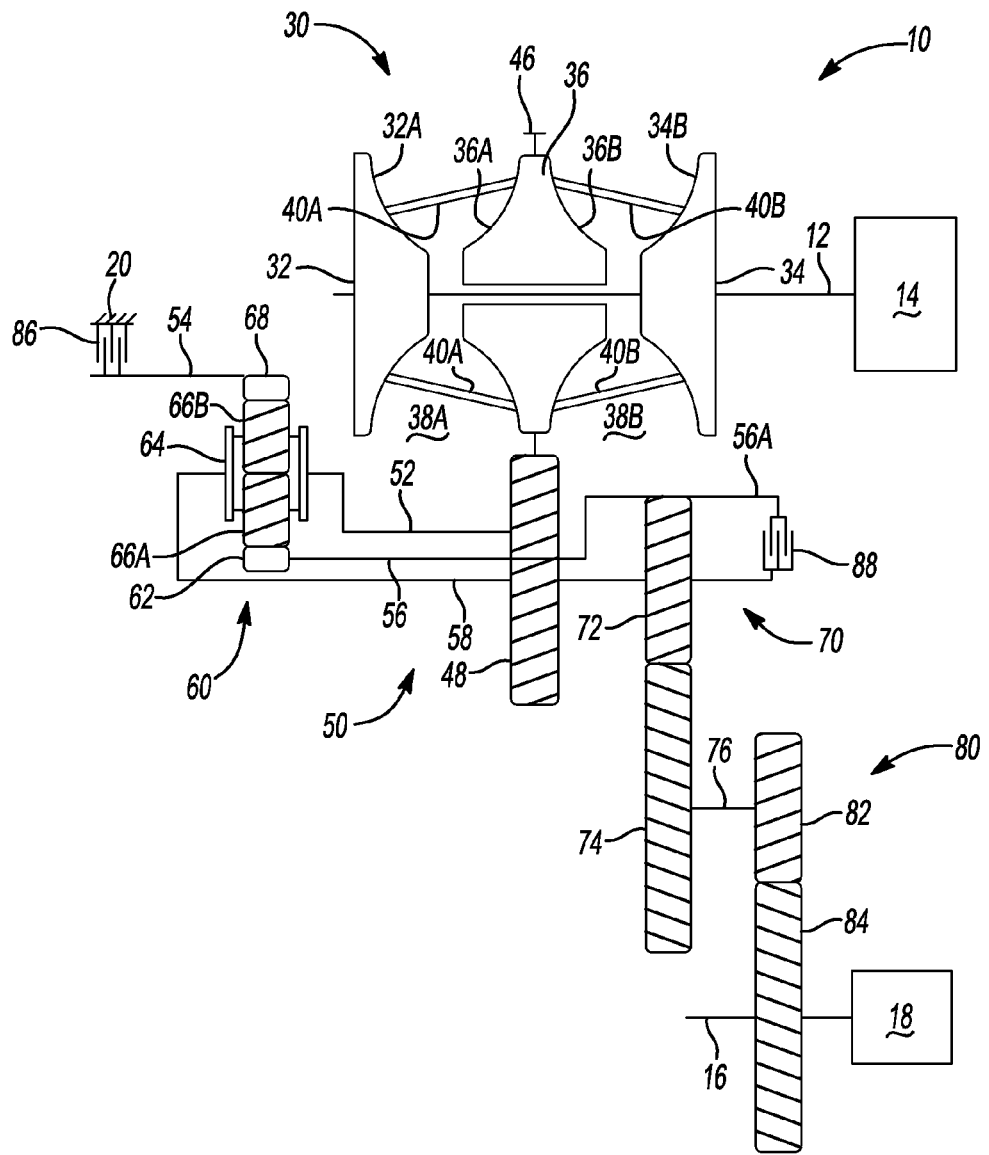
FIG. 2 is a stick diagram of a single mode continuously variable automatic transmission having a compound planetary gear assembly according to the present invention.

Referring now to FIG. 2, the automatic transmission 10 is a single mode continuously variable lay shaft transmission (CVT) having a compound planetary gear assembly. As noted above, the transmission 10 includes the typically cast, metal housing 20 which encloses and protects the various components of the automatic transmission 10. The housing 20 includes a variety of apertures, passageways, shoulders and flanges which position and support these components. The automatic transmission 10 includes the transmission input shaft 12 which receives drive torque from the prime mover 14 and the transmission output shaft 16 which delivers drive torque to the final drive assembly 18.

The automatic transmission 10, proper, includes three transfer gear sets, a compound planetary gear assembly, a clutch, a brake, a variator and several shafts, quills or other drive members. The variator 30 is illustrated as a toroidal race rolling type variator. However, it should be appreciated that various other types of variators may be employed without departing from the scope of the present invention. The variator 30 includes the input shaft 12 which is coupled to and driven by the prime mover 14 and a first input disc 32 and a second input disc 34 which are both coupled to and driven by the input shaft 12. The first input disc 32 includes a first toroidal inner surface or race 32A and the second input disc 34 includes a second toroidal inner surface or race 34B. Disposed between the first and second input discs 32 and 34 is a double output disc 36. The double output disc 36 includes a first toroidal outer surface or race 36A and a second toroidal outer surface or race 36B. The first output race 36A is disposed opposite the first input race 32A and the second output race 36B is disposed opposite the second input race 34B. The first input race 32A and the first output race 36A cooperate to define a first toroidal cavity 38A and the second input race 34B and the second output race 36B cooperate to define a second toroidal cavity 38B. Each of the discs 32, 34, and 36 share a common rotational axis defined by the input shaft 12. The input discs 32 and 34 transfer drive torque to the double output disc 32 via a first plurality of rollers 40A and a second plurality of rollers 40B.

For example, the first toroidal cavity 38A includes the first plurality of rollers 40A and the second toroidal cavity 48B includes the second plurality of rollers 40B. Typically each of the first and second cavities 38A and 38B include two or three rollers 40A and 40B, though it should be appreciated that any number of rollers may be employed without departing from the scope of the present invention. Each of the first plurality of rollers 40A is mounted for rotation about a roller axis and rolls upon the first toroidal races 32A and 36A of the associated input and output discs 32 and 36 and each of the second plurality of rollers 40B is mounted for rotation about a roller axis and rolls upon the second toroidal races 34B and 36B of the associated input and output discs 34 and 36 to transfer torque from the input discs 32 and 34 to the double output disc 36. Changes in variator torque ratio are achieved by precession of the rollers 40A and 40B such that the roller's axes are able to turn to change the inclination of the roller axes to the variator axis defined by the input shaft 12. Precession of the rollers 40A and 40B results in changes of the radii of the paths traced upon the races 32A and 36A and 34B and 36B by the rollers 40A and 40B and hence results in a change of variator drive ratio between the input discs 32 and 34 and the double output disc 36.

A variator output, first or drive gear 46 of the first transfer gear pair 50 is secured to, or integrally formed with, the double output disc 36, extends about its periphery and is in constant mesh with a second or driven gear 48 of the first transfer gear pair 50. The second or driven gear 48 of the first transfer gear pair 50 is coupled to and drives a planet gear carrier 64 of the compound planetary gear assembly 60 through a first shaft, quill or drive member 52. The compound planetary gear assembly 60 also includes a sun gear 62, a ring gear 68 and a plurality of pairs of planet gears 66A and 66B (one pair of which is illustrated in FIG. 2) which are rotatably supported and carried in the planet gear carrier 64. Each of the inner planet gears 66A is in constant mesh with the sun gear 62 and a respective one of the outer planet gears 66B and each of the outer planet gears 66B is in constant mesh with the respective one of the inner planet gears 66A and the ring gear 68. The ring gear 68 of the compound planetary gear assembly 60 is coupled through a second shaft, quill or member 54 to the friction brake 86. Activation of the friction brake 86 grounds the ring gear 68 of the compound planetary gear assembly 60 to the housing 20.

The sun gear 62 is coupled through a third shaft, quill or drive member 56 to a first or drive gear 72 of the second transfer gear pair 70. An extension 56A of the third shaft, quill or drive member 56 is connected to one side of the friction clutch 88. The other side of the friction clutch 88 is connected through a fourth shaft, quill or drive member 58 which may be an extension or segment of the first shaft, quill or drive member 52 to the planetary gear carrier 64 of the compound planetary gear assembly 60. Activation of the friction clutch 88 connects the first or drive gear 72 of the second transfer gear pair 70 to the planetary gear carrier 64 of the compound planetary gear assembly 60.

The first or drive gear 72 of the second transfer gear pair 70 is in constant mesh with a second or driven gear 74 which is disposed upon, coupled to and drives a fifth shaft, quill or drive member 76. In turn, the fifth shaft, quill or drive member 76 is coupled to and drives the first or drive gear 82 of the third transfer gear pair 80. The first or drive gear 82 of the third transfer gear pair 80 is in constant mesh with a second or driven gear 84 which is disposed upon, coupled to and drives the output shaft 16.

Referring now to FIG. 3, a truth table illustrates the various clutch and brake states as well as the highest and lowest forward gear ratios in an automatic transmission 10 according to the present invention. At the outset, it should be understood that the subject automatic transmission 10 is a single mode transmission, that is, only a single clutch or brake is engaged during (and to select) either the forward or reverse direction of vehicle travel. There is no sequence of engaging and releasing clutches and brakes as the speed and gear ratios change, merely a single brake to engage and provide reverse and a single clutch to engage and provide forward motion.

Thus, the first column indicates the gear state, i.e., reverse, neutral, first, second, etc. and the second column indicates the actual numerical gear ratio through the automatic transmission 10 in reverse and first and sixth gears which represent the highest gear ratio (lowest numerical gear) and lowest gear ratio (highest numerical gear), respectively. In the third column, the state of the friction clutch 88 which, when engaged, provides the forward gears, is indicated by an "X" (meaning on or engaged) and in the fourth column, the state of the friction brake 86 which, when engaged, provides reverse, is likewise indicated by an "X" (also meaning on or engaged).

In as much as the variator 30 provides an essentially infinite number of gear ratios from its highest ratio (lowest gear) to its lowest ratio (highest gear), the format of and the data provided by a conventional clutching table has little relevance as, first of all, no clutch or brake changes, i.e., engagement and disengagement, occurs as the ratio of the variator 30 changes and, second of all, there are no specifically defined or identifiable gear ratios such as second gear, third gear, fourth gear, etc.

Rather, the only identifiable gears or gear ratios are the highest and lowest ratios as noted above, which are here nominally referred to as first and sixth gears. Accordingly, in column five, only the fact that the transmission 10 is in reverse is indicated and the attendant gear ratio is presented in column two. In column six, the transmission 10 is in forward and the ratio of first gear (the highest ratio of the transmission 10) is presented in column two. In column seven, the transmission is also in forward and the ratio of sixth gear (the lowest ratio of the transmission 10) is presented in column two.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission for a motor vehicle comprising, in combination,
an input member,
an output member,
a variator having an input coupled to said input member and an output,
a first transfer gear set having a first gear coupled to said output of said variator and a second gear,
a planetary gear assembly having a first element, a second element and a third element,
a friction brake coupled to one of said elements of said planetary gear assembly, another of said elements of said planetary gear assembly coupled to said second gear of said first transfer gear set,
a second transfer gear set having a first gear coupled to yet another element of said planetary gear assembly and a second gear operably driving said output member, and
a friction clutch disposed between said first gear of said second transfer gear set and said another of said elements of said planetary gear assembly.

2. The transmission for a motor vehicle of claim 1 wherein said planetary gear assembly elements include a sun gear, a planet gear carrier and a ring gear.

3. The transmission for a motor vehicle of claim 1 wherein said one of said elements is a ring gear, said another of said elements is a planet gear carrier and said yet another of said elements is a sun gear.

4. The transmission for a motor vehicle of claim 1 further including a housing and wherein said friction brake is disposed between a ring gear of said planetary gear assembly and said housing.

5. The transmission for a motor vehicle of claim 1 further including a housing and wherein said one of said elements of said planetary gear assembly is a ring gear and said friction brake is operably disposed between said ring gear of said planetary gear assembly and said housing.

6. The transmission for a motor vehicle of claim 1 further including a third transfer gear set having a first gear coupled to said second gear of said second transfer gear set and a second gear coupled to and driving an output shaft and a final drive assembly.

7. The transmission for a motor vehicle of claim 1 wherein said variator includes a pair of input discs, a pair of output discs and a pluralities of rollers disposed between said pairs of input and output discs.

8. A transmission for a motor vehicle comprising, in combination,
an input member,
an output member,
a variator having an input coupled to and driven by said input member and an output,
a first transfer gear set having a first gear coupled to and driven by said output of said variator and a second gear,
a planetary gear assembly having a first element, a second element and a third element,
a friction brake coupled to one of said elements of said planetary gear assembly, another of said elements of said planetary gear assembly coupled to said second gear of said first transfer gear set,
a second transfer gear set having a first gear coupled to yet another element of said planetary gear assembly and a second gear,
a friction clutch operably disposed between said first gear of said second transfer gear set and said another of said elements of said planetary gear assembly, and
a third transfer gear set having a first gear coupled to said second gear of said second transfer gear set and a second gear coupled to and driving said output member.

9. The transmission for a motor vehicle of claim 8 wherein said planetary gear assembly elements include a sun gear, a planet gear carrier and a ring gear.

10. The transmission for a motor vehicle of claim 8 wherein said one of said elements is a ring gear, said another of said elements is a planet gear carrier and said yet another of said elements is a sun gear.

11. The transmission for a motor vehicle of claim 8 further including a housing and wherein said friction brake is disposed between a ring gear of said planetary gear assembly and said housing.

12. The transmission for a motor vehicle of claim 8 further including a housing and wherein said one of said elements of said planetary gear assembly is a ring gear and said friction brake is operably disposed between said ring gear of said planetary gear assembly and said housing.

13. The transmission for a motor vehicle of claim 8 wherein said planetary gear assembly is a compound planetary gear assembly having a plurality of first planet gears in mesh with a sun gear and a plurality of second planet gears in mesh with a ring gear and said plurality of first planet gears.

14. An automatic transmission for a motor vehicle comprising, in combination,
an input shaft,
an output shaft,
a variator having an input coupled to and driven by said input member and an output,
a first transfer gear set having a first gear coupled to and driven by said output of said variator and a second gear,
a planetary gear assembly having a sun gear, a planet gear carrier having a plurality of pairs of meshing planet gears and a ring gear,
a friction brake coupled to said ring gear of said planetary gear assembly, said planet gear carrier of said planetary gear assembly coupled to said second gear of said first transfer gear set,
a second transfer gear set having a first gear coupled to said sun gear of said planetary gear assembly and a second gear operably driving said output shaft, and
a friction clutch disposed between said first gear of said second transfer gear set and said planet gear carrier of said planetary gear assembly.

15. The automatic transmission for a motor vehicle of claim 14 further including a third transfer gear set having a first gear coupled to said second gear of said second transfer gear set and a second gear coupled to and driving said output shaft.

16. The automatic transmission for a motor vehicle of claim 14 further including an engine coupled to and driving said input shaft and a third transfer gear set having a first gear coupled to said second gear of said second transfer gear set and a second gear coupled to and driving said output shaft and a final drive assembly.

17. The automatic transmission for a motor vehicle of claim 14 wherein said planetary gear assembly is a compound planetary gear assembly having a plurality of first planet gears in mesh with a sun gear and a plurality of second planet gears in mesh with a ring gear and said plurality of first planet gears.

18. The automatic transmission for a motor vehicle of claim 14 further including a housing and wherein said friction brake is disposed between said ring gear of said planetary gear assembly and said housing.

* * * * *